(12) United States Patent
Strasser (10) Patent No.: US 9,707,976 B2
(45) Date of Patent: Jul. 18, 2017

(54) HAND BRAKE ZIP LINE DEVICE

(71) Applicant: Outdoor Ventures Group, LLC, Southport, CT (US)

(72) Inventor: Philipp Strasser, Hinterbruehl (AT)

(73) Assignee: Outdoor Ventures Group, LLC, Southport, CT (US)

( * ) Notice: Subject to any disclaimer, the term of this patent is extended or adjusted under 35 U.S.C. 154(b) by 0 days.

(21) Appl. No.: 14/766,067

(22) PCT Filed: Jan. 30, 2014

(86) PCT No.: PCT/US2014/013836
§ 371 (c)(1),
(2) Date: Aug. 5, 2015

(87) PCT Pub. No.: WO2014/123750
PCT Pub. Date: Aug. 14, 2014

(65) Prior Publication Data
US 2015/0375758 A1    Dec. 31, 2015

Related U.S. Application Data (60) Provisional application No. 61/760,836, filed on Feb. 5, 2013.

(51) Int. Cl.
*B61B 7/00* (2006.01)
*B61B 12/12* (2006.01)
(Continued)

(52) U.S. Cl.
CPC ............ *B61B 12/122* (2013.01); *A63G 21/20* (2013.01); *A63G 21/22* (2013.01); *B61B 7/00* (2013.01); *B61H 9/02* (2013.01); *F16D 63/008* (2013.01)

(58) Field of Classification Search
CPC ......... B61B 12/12; B61B 12/122; B61B 7/00; B61B 7/02; B61B 7/04; A63G 21/20; A63G 21/22; B61H 9/02; F16D 63/008
See application file for complete search history.

(56) References Cited

U.S. PATENT DOCUMENTS 4,062,293 A  * 12/1977  Davis .................... A63G 21/20
                                                              104/113
5,113,768 A  *  5/1992  Brown .................... B61B 7/02
                                                              104/112

(Continued)

OTHER PUBLICATIONS

International Search Report (PCT/ISA/210) dated May 19, 2014 (Two (2) pages).

(Continued)

*Primary Examiner* — Jason C Smith
(74) *Attorney, Agent, or Firm* — Crowell & Moring LLP (57) ABSTRACT

A device that is movable along a track defined by a cable has a main frame including a pair of side walls and a transverse connector by which the side walls are joined together. A pair of pulleys is disposed between the side walls, with the pulleys being engagable with a cable and rotatable for movement of the device along the cable. A fitting by which handles are removably attachable to the main frame is secured between the side walls, and aligned receptacles in the side walls provide for reception of hardware to preclude disengagement of the cable from the pulleys during use.

16 Claims, 11 Drawing Sheets

(51) Int. Cl.
*A63G 21/20* (2006.01)
*B61H 9/02* (2006.01)
*F16D 63/00* (2006.01)
*A63G 21/22* (2006.01)

(56) References Cited

U.S. PATENT DOCUMENTS

| | | | | |
|---|---|---|---|---|
| 5,701,824 A * | 12/1997 | Johnson | ............... | H02G 11/003 104/112 |
| 6,199,829 B1 * | 3/2001 | Brown | ............... | B65H 51/14 104/112 |
| 6,334,507 B1 * | 1/2002 | Westerweel | ....... | A62B 35/0056 104/112 |
| 6,345,578 B1 * | 2/2002 | Pabst | ............... | B61B 12/04 104/112 |
| 6,810,818 B2 * | 11/2004 | Petzl | ............... | A63G 21/22 104/93 |
| 7,299,752 B1 * | 11/2007 | Cylvick | ............... | B61B 7/02 104/112 |
| 7,381,137 B2 * | 6/2008 | Steele | ............... | B61B 7/00 104/113 |
| 7,404,360 B2 | 7/2008 | Cylvick | | |
| 7,637,213 B2 | 12/2009 | Cylvick | | |
| 7,819,066 B2 * | 10/2010 | Smith | ............... | A63G 21/22 104/112 |
| 7,966,940 B2 * | 6/2011 | Cylvick | ............... | A63G 21/22 104/113 |
| 7,966,941 B1 * | 6/2011 | Brannan | ............... | A63G 21/22 104/112 |
| 8,042,474 B2 * | 10/2011 | Perakis | ............... | A63G 21/22 104/112 |
| 8,234,980 B2 * | 8/2012 | Boren | ............... | B61H 9/02 104/112 |
| 8,316,990 B2 * | 11/2012 | Uhlig | ............... | A62B 35/0093 104/115 |
| 8,327,770 B2 * | 12/2012 | Boren | ............... | B66C 9/18 104/112 |
| 8,333,155 B2 * | 12/2012 | Cylvick | ............... | A63G 21/20 104/112 |
| 8,336,463 B2 * | 12/2012 | Smith | ............... | B61B 7/00 104/112 |
| 2009/0049946 A1 * | 2/2009 | Buckman | ............... | A63G 21/22 74/502.2 |
| 2009/0255436 A1 * | 10/2009 | Buckman | ............... | A63G 21/22 104/117.1 |
| 2011/0047764 A1 * | 3/2011 | Strasser | ............... | F16B 45/025 24/599.5 |
| 2011/0162917 A1 * | 7/2011 | Steele | ............... | A63G 21/22 188/65.2 |
| 2011/0239898 A1 * | 10/2011 | Brown | ............... | A63G 21/20 105/150 |
| 2015/0375758 A1 * | 12/2015 | Strasser | ............... | A63G 21/20 105/150 |

OTHER PUBLICATIONS

Written Opinion (PCT/ISA/237) dated May 19, 2014 (Four (4) pages).

* cited by examiner

HAND BRAKE ZIP LINE DEVICE

This application claims priority to U.S. provisional application 61/760,836, filed Feb. 5, 2013, the entire disclosure of which is incorporated by reference herein as non-essential subject matter.

BACKGROUND OF THE INVENTION

Field of the Invention

The present invention concerns an improved and simplified construction for a cable or zipline device.

Description of Related Art

Zipline cable arrangements are commonly used for recreation and other purposes. U.S. Pat. No. 7,381,137 to Steele et al. and U.S. Patent Application Publications 2009/0049946 and 2009/0255436, both to Buckman, and 2011/0162917 to Steele et al. concern overall zipline cable arrangements.

Certain elements of such zipline cable arrangements also form the subject matter of numerous patents. U.S. Pat. No. 4,062,293 to Davis, U.S. Pat. No. 5,701,824 to Johnson et al., U.S. Pat. No. 6,334,507 to Westerweel, U.S. Pat. No. 7,966,941 to Brannan, U.S. Pat. Nos. 7,819,066 and 8,336,463, both to Smith, and U.S. Pat. Nos. 8,234,980 and 8,327,770, both to Boren et al. are examples of such patents.

Other documents that could be of interest include U.S. Pat. No. 5,113,768 to Brown, U.S. Pat. No. 6,199,829 to Brown et al., U.S. Pat. No. 6,345,578 to Pabst, U.S. Pat. Nos. 7,299,752, 7,404,360, 7,637,213, 7,966,940, and 8,333,155, all to Cylvick, U.S. Pat. No. 8,042,474 to Perakis, and U.S. Pat. No. 8,316,990 to Uhlig et al.

SUMMARY OF THE INVENTION

In one preferred configuration, a device that is movable along a track defined by a cable has a main frame including a pair of side walls and a transverse connector by which the side walls are joined together. A pair of pulleys is disposed between the side walls, with the pulleys being engageable with a cable and rotatable for movement of the device along the cable. A fitting by which handles are removably attachable to the main frame is secured between the side walls, and aligned receptacles in the side walls provide for reception of hardware to preclude disengagement of the cable from the pulleys during use. Each of the pulleys is unidirectionally rotatable, and each of the receptacles mentioned above is formed by an eye in one of the side walls. Additional receptacles are included in the main frame for securing additional hardware, and the main frame may include flanges on the side walls permitting additional hardware to be hung or mounted.

DETAILED DESCRIPTION OF THE INVENTION

It is to be understood that, throughout this description, terms such as "front," "rear," "top," and "bottom" are used for convenience only. These terms are not to be considered to limit the invention in any way.

Figure 1:
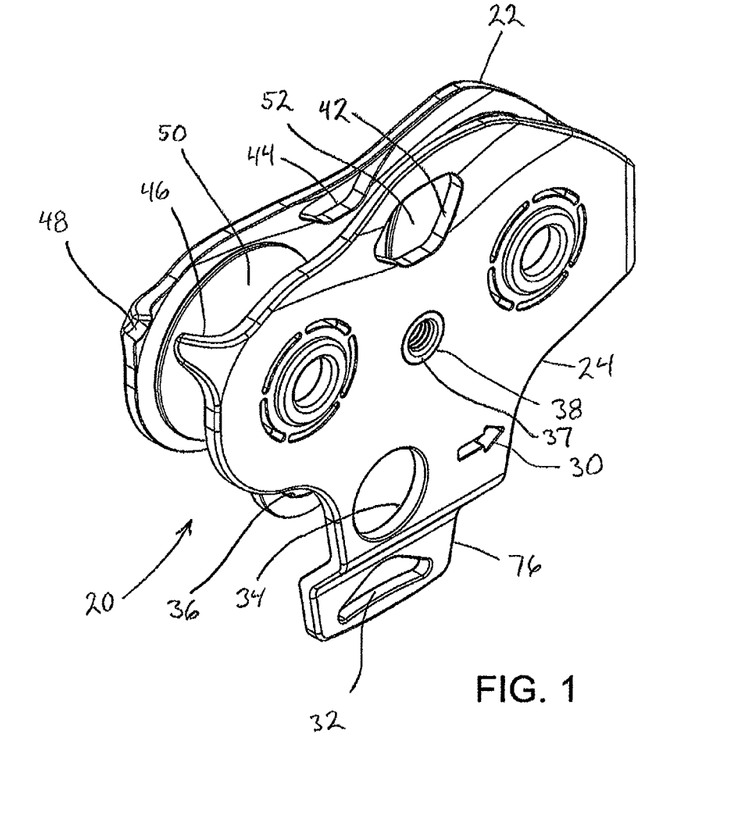
FIG. 1 is a perspective view from behind and above one embodiment of a device according to the invention.

FIG. 1 is a perspective rear view from above one embodiment of the invention. The device shown in FIG. 1 includes a main frame 20 having a pair of side walls 22 and 24 joined together by a transverse connector, here shown as a wall 26, located at the front end of the device as best seen in FIGS. 2 and 5-10. Transverse connectors of other types, such as a screw or screws, a weld or welds, and so on, could alternatively or additionally be used. The main frame is formed of an appropriately rigid material, such as steel, stamped or otherwise formed into the appropriate configuration. The side wall 24 is provided with a stamped, etched, or otherwise formed arrow 30, identifying the riding or travel direction of the device, and an eye 32 for direct, non-releasable connection to an appropriate safety harness or hardware (not shown) worn by a participant.

Figure 2:
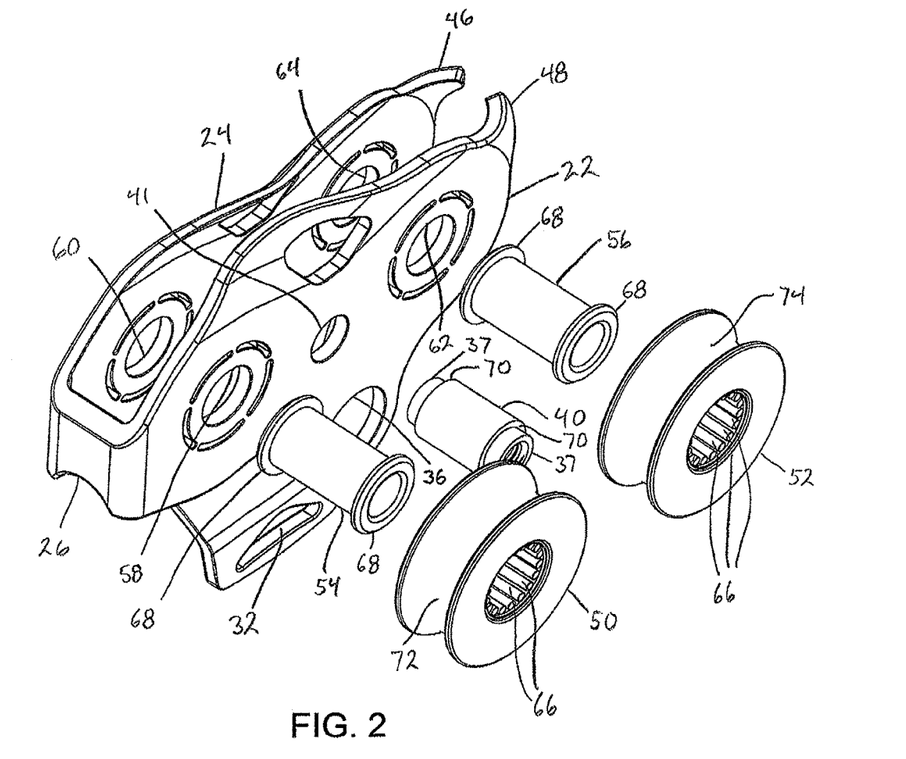
FIG. 2 is an exploded perspective view from in front and above the device shown in FIG. 1.
Figure 9:
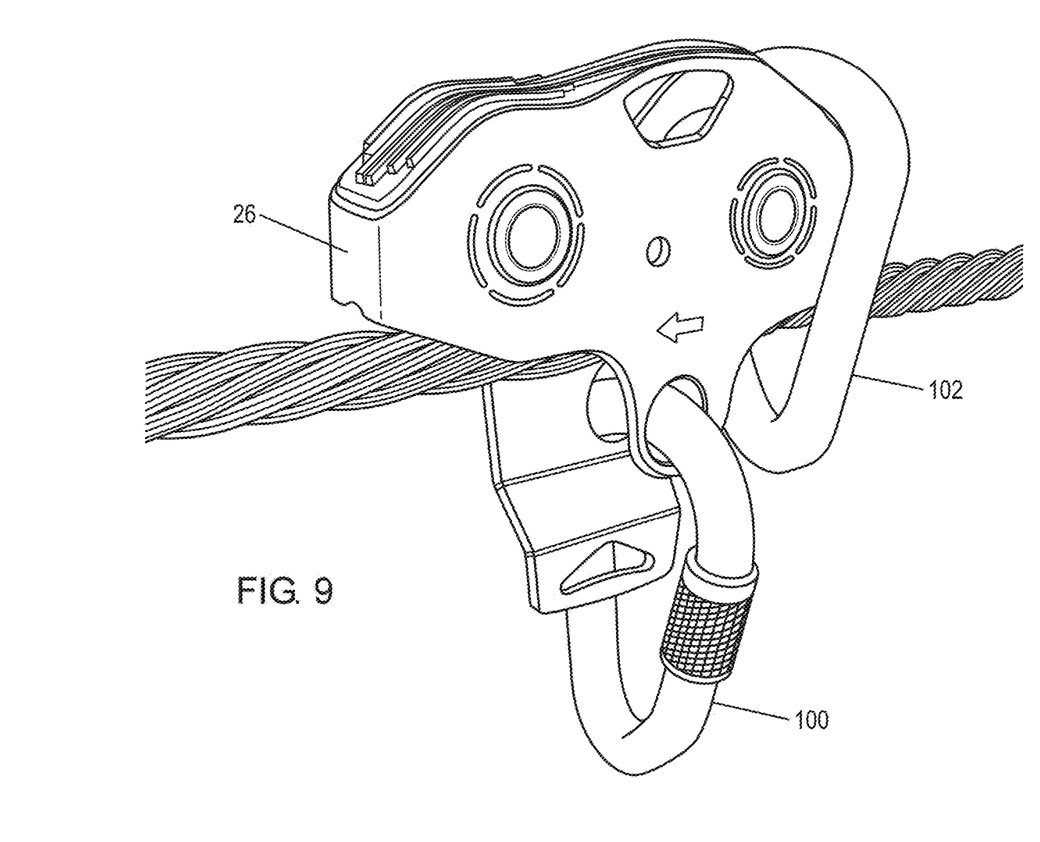
FIG. 9 is a view of the device shown in FIG. 1 after placing pulleys of the device on a cable or zipline, securing the device to the cable with a carabiner, and placing another carabiner on side wall flanges or ears of the main frame.

Referring now to the exploded perspective view provided by FIG. 2 as well as to FIG. 1, the side wall 24 also includes a receptacle, here formed by an eye 34, aligned with a corresponding receptacle, formed here by an eye 36 in the side wall 22, to form a double eye connection 34, 36 for receiving hardware, such as a pin or carabiner, such as the carabiner 100 shown in FIG. 9, when the device is in use. The side wall 24 also includes a hole 38, in which one of a pair of reduced diameter ends 37 of a threaded fitting 40 (FIG. 2) is mountable, an eye 42, aligned with a corresponding eye 44 in the side wall 22, to receive an auxiliary rope, wire, or carabiner, and a flange or ear 46, aligned with a corresponding flange or ear 48 on the side wall 22, to support another carabiner, such as the carabiner 102 shown in FIG. 9, on the rear end of the device. Pulleys 50, 52 are mounted by bearings 66 (FIG. 2) on respective axles 54, 56 that are to be affixed in place within axle hole pairs 58, 60 and 62, 64 in the side walls 22 and 24, as is apparent from FIG. 2. Bearings 66 are conventional bearings, appropriately sized, permitting unidirectional rotation of each pulley 50, 52 about the axles 54, 56 so that the main frame 20, in use, freely travels in one direction along the cable or zipline, but with significant resistance in the opposite direction. The unidirectionally rotating bearings constitute a "ratchet" or "hand brake" acing in one direction. Flanges 68 on opposing ends of each axle 54, 56 abut outer surfaces of the side walls 22 and 24 to retain the axles 54, 56 in position. It will be recognized that to facilitate connection of the axles 54, 56 to the main frame 20, one of the flanges 68 on each axle 54, 56, may be removable, e.g. by way of a threaded connection.

As shown in FIG. 2, the reduced diameter ends 37 of the threaded fitting 40 define shoulders 70 for abutment with respective inner surfaces of the side walls 22 and 24. The hole 41 in the wall 22 shown in FIG. 2 is aligned with the hole 38 in the wall 24 shown in FIG. 1, and receives one of the two ends 37 of the fitting 40.

In use, the transverse wall 26 at the front end of the device can serve as a bumper that may run into an external braking device. The threaded interior of each of the pair of reduced diameter ends 37 of the fitting 40 is adapted to receive a screw secured to a detachable handle, as will be described. When the device is to be used, the frame 20 is placed over the cable or zipline along which travel is to occur. Once the cable or zipline is appropriately positioned in grooves 72, 74 of the pulleys 50, 52, the carabiner 100 (FIG. 9) is secured within the aligned eyes 34, 36 in the side walls 22, 24 to preclude disengagement of the cable or zipline from the pulley grooves 72, 74.

Figure 3:
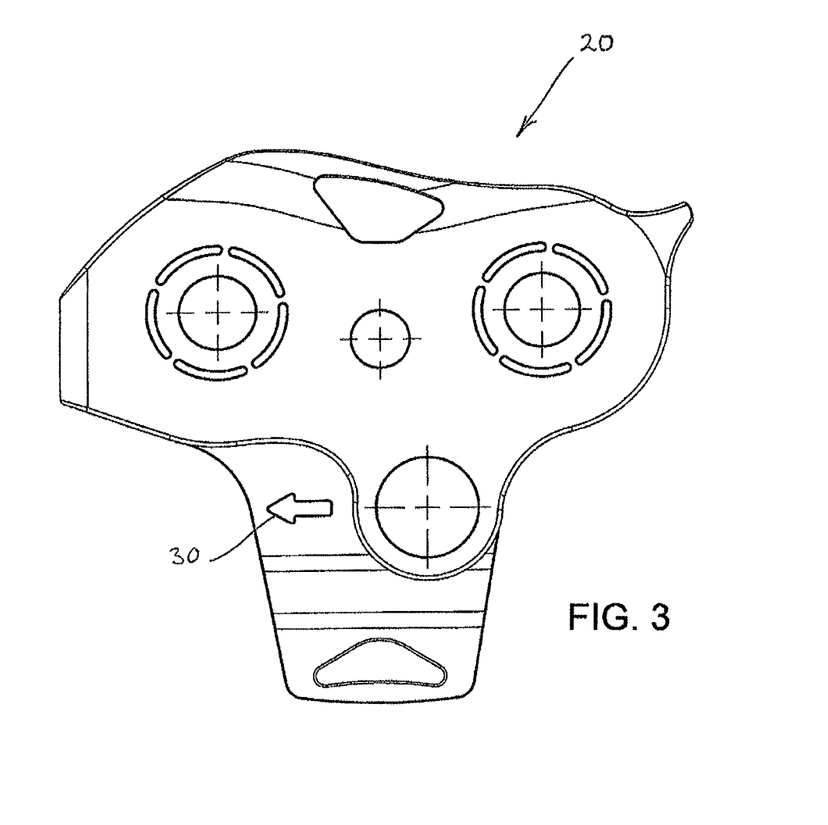
FIG. 3 is a lateral view of one side of a main frame forming part of the device illustrated in FIG. 1.
Figure 4:
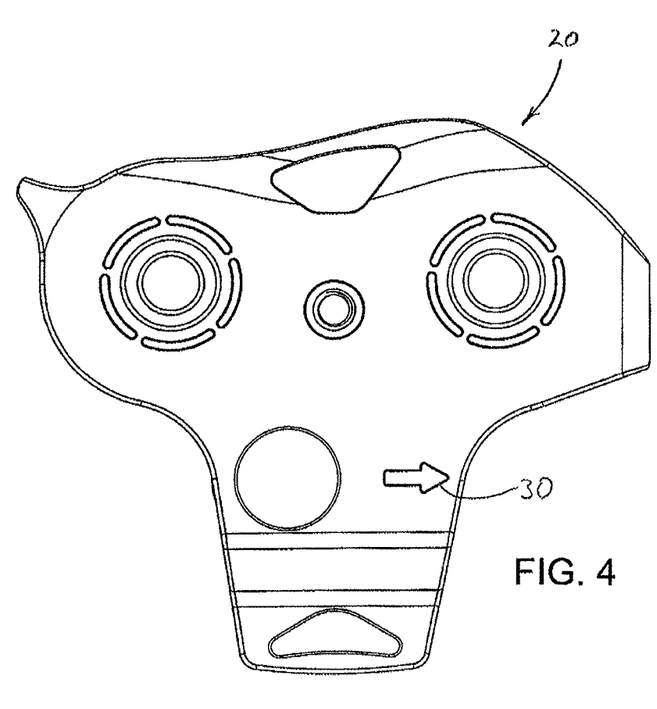
FIG. 4 is a lateral view of the device shown in FIG. 1, illustrating the other side of the main frame shown in FIG. 3.

Referring now to FIG. 3, it will be seen that, viewed laterally, the main frame 20, overall, is asymmetrical to make identification of the proper running direction of the device easy. The arrow 30 assists as well in this regard. The arrow 30, preferably, is visible from both sides of the frame 20, as a comparison of FIGS. 3 and 4 shows. This can be readily accomplished by simply stamping a hole in the shape of the arrow in the side wall 24 when the main frame 20 is produced.

Figure 5:
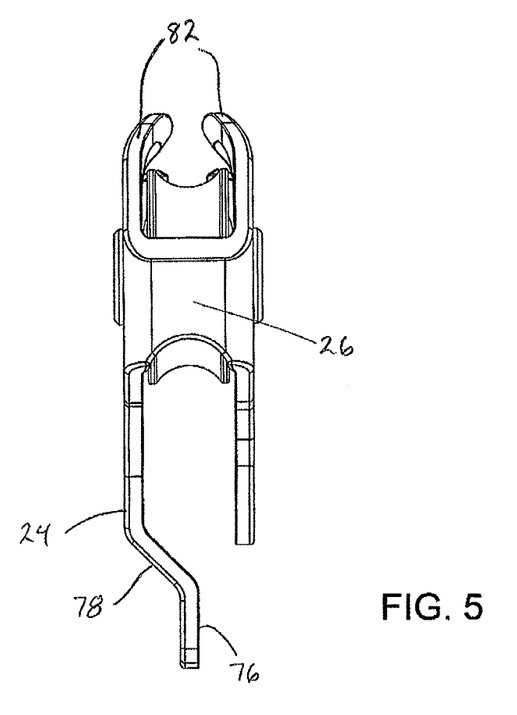
FIG. 5 is a front view of the device shown in FIG. 1.
Figure 6:
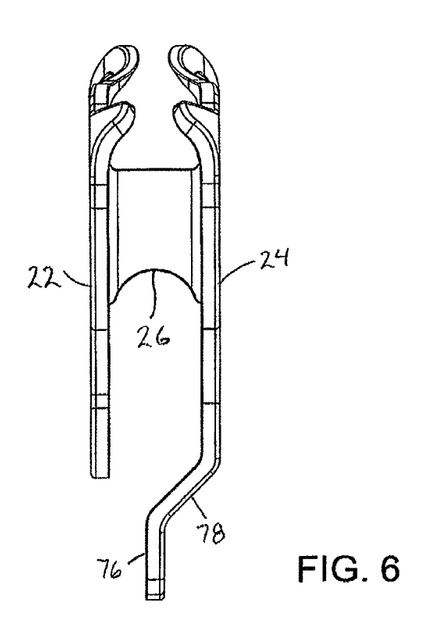
FIG. 6 is a rear view of the main frame shown in FIG. 3.
Figure 7:
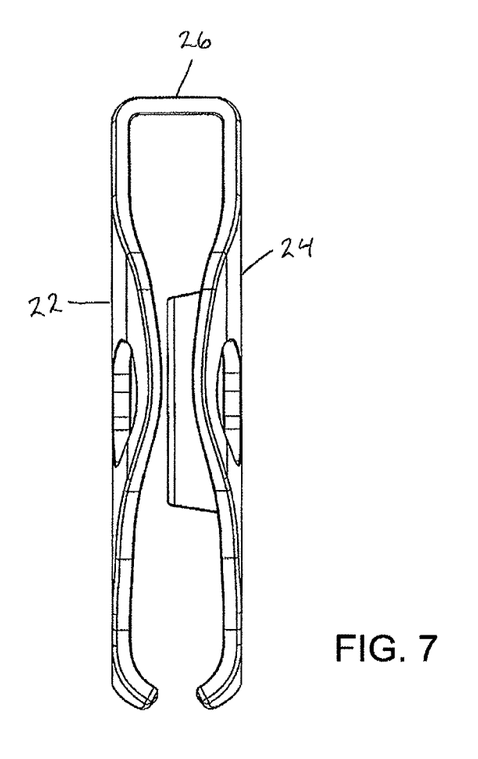
FIG. 7 is a view from above the main frame shown in FIG. 3.
Figure 8:
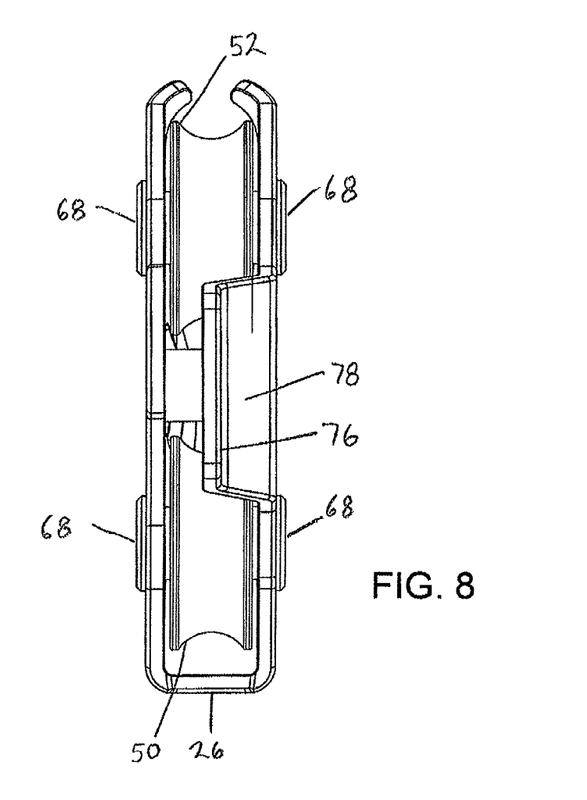
FIG. 8 is a view from below the device shown in FIG. 1.

FIG. 5 illustrates the side plate 24 as having an offset flange section 76, within which the eye 32 is provided for connection to a user's safety harness or hardware. The flange section 76 is preferably laterally displaced in an amount sufficient to assure that the eye 32 is centered with respect to the rest of the main frame 20 to avoid tilting during use. An angled intermediate section 78 interconnects that offset flange section 76 with the remainder of the side wall 24, as shown in FIGS. 5-6.

From the description supplied, it will be apparent that the main frame 20 preferably has a unibody (one piece) metal construction. The pulleys 50, 52 are steel wheels with dimensions that, typically, will be in a range extending from 1.5" to 3.0". The bearings 66, again, are conventional, unidirectional bearings installed on the steel wheels. The transverse wall 26 is designed to provide protection for the unit in the event of contact with a brake/stopping mechanism.

Figure 10:
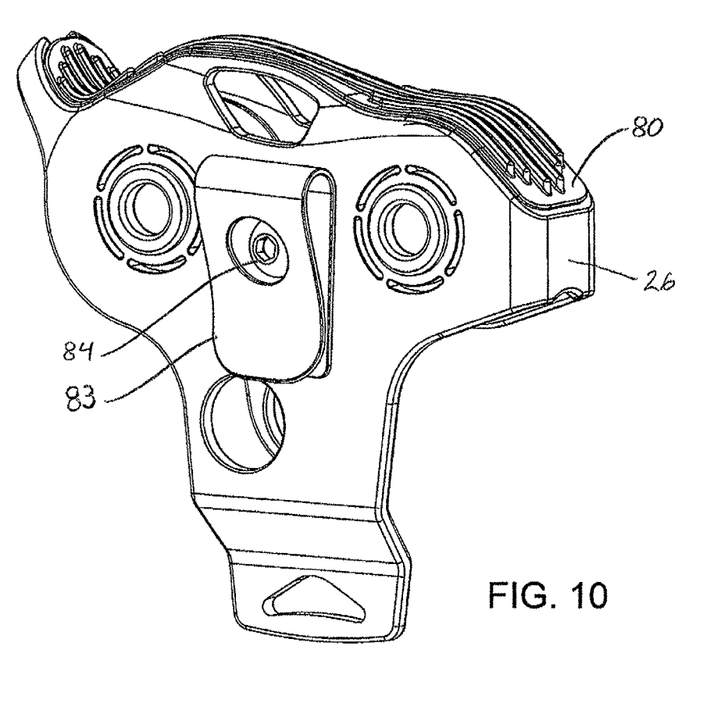
FIG. 10 illustrates a protective piece secured in place over a top edge of the main frame of the device, as well as a clip facilitating ready transport of the device.

As best illustrated in FIG. 10, a protective piece 80 is secured in place over a top edge 82 (FIG. 5) of the main frame 20 to overlie the pulleys 50, 52. This protective piece minimizes effects of debris and helps to prevent hands and fingers from contacting the pulleys. The protective piece 80, at its rear end, is contoured to match the flanges or ears 46, 48. Flanges or ears 46, 48 of the main frame 20 are specially designed carabiner rests or holds that serve to avoid accidental hooking of a carabiner as a life support.

Figure 11:
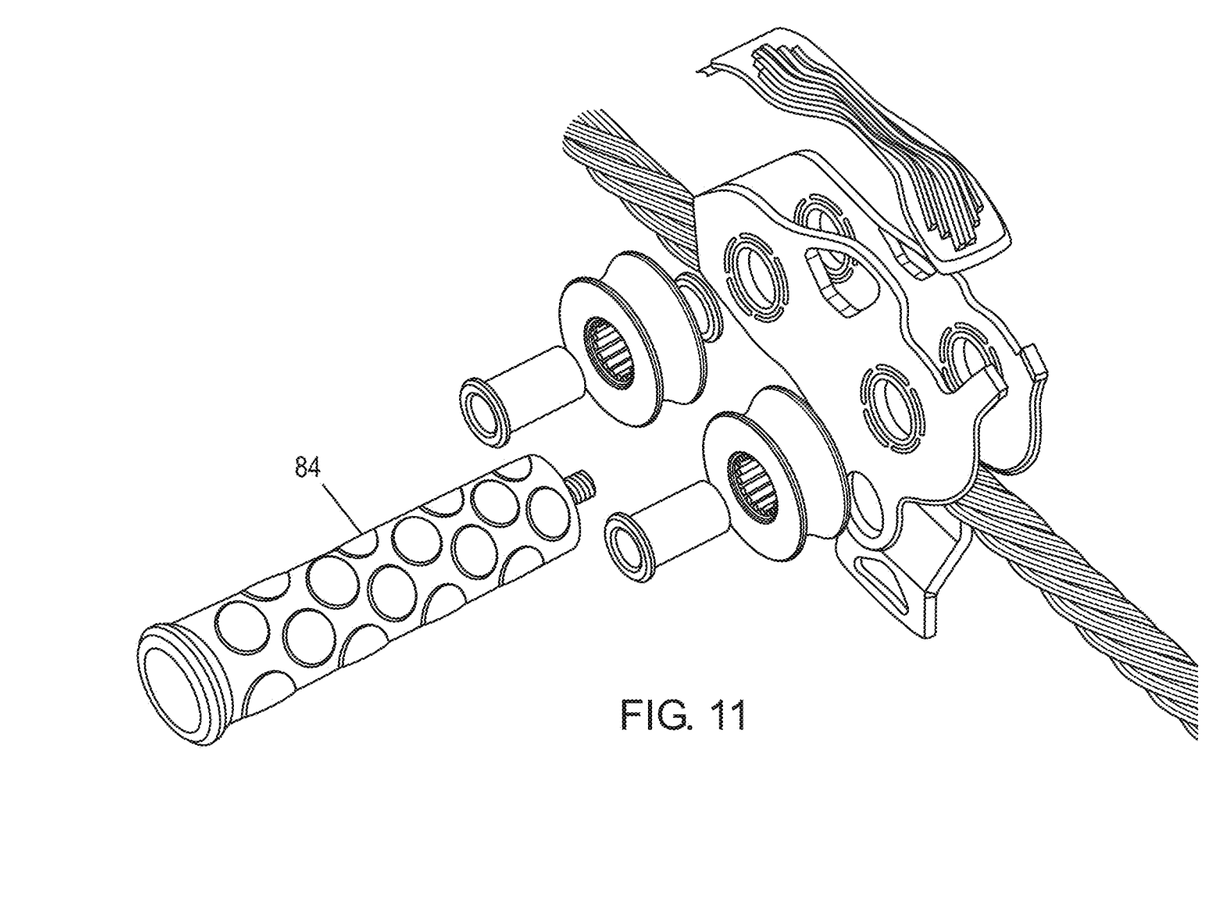
FIG. 11 is an exploded view showing the protective piece of FIG. 10 displaced away from the top edge of the main frame, as well as one of a pair of auxiliary handles detachably securable by way of a threaded fitting to the main frame.

The threaded fitting 40 mounted between the steel side walls 22, 24 mentioned provides separate specialty holes for attaching auxiliary handles; one handle 84 of a pair of such handles is illustrated in the exploded view supplied by FIG. 11. The eyes 42, 44 in the steel sides can be used as separate specialty holes for attaching an auxiliary carabiner to connect an auxiliary trolley. Referring again to FIG. 10, a clip 83 is shown as securable in place by a fastener 84 for ready transport, e.g. on a belt, of the main frame 20 and elements attached thereto. It is contemplated that the fastener 84 will be securable to the threaded fitting 40 between periods of use in place of one of the detachable auxiliary handles.

The foregoing disclosure has been set forth merely to illustrate the invention and is not intended to be limiting. Modifications of the disclosed embodiments incorporating the spirit and substance of the invention may occur to persons skilled in the art, and the invention should be construed to include everything within the scope of the invention ultimately claimed.

The invention claimed is:

1. A device that is movable along a track defined by a cable comprising:
   a main frame including a pair of side walls joined together by a transverse wall,
   a pair of pulleys disposed between the side walls, the pulleys being engagable with the cable and unidirectionally rotatable for movement of the device along the cable so that the main frame, in use, freely travels in one direction along the cable, but with significant resistance in another direction along the cable opposite to said one direction,
   a fitting by which handles are removably attachable to the main frame, and
   aligned receptacles in the side walls for reception of hardware to preclude disengagement of the cable from the pulleys during use.

2. The device of claim 1, wherein the hardware to preclude disengagement of the cable is formed by at least one carabiner.

3. The device of claim 2, further comprising flanges on the side walls by which at least one additional carabiner is mountable on the main frame.

4. The device of claim 3, further comprising a protective covering piece securable over top edges of the side walls, the transverse wall, and the flanges.

5. A process of securing the device of claim 2 to a cable or zipline for use comprising:
   placing the main frame over a cable or zipline along which travel in the one direction is to occur to engage the cable or zipline in grooves of the pulleys, and
   securing said at least one carabiner in the aligned receptacles in the side walls to preclude disengagement of the cable from the pulleys during use.

6. The process of claim 5, further comprising attaching a clip to the fitting in place of at least one of the handles.

7. The process of claim 5, wherein each of the receptacles is formed by an eye in one of the side walls.

8. The process of claim 5, further comprising securing additional hardware to the main frame by way of additional receptacles.

9. The process of claim 5, further comprising mounting additional hardware on flanges on the side walls of the main frame.

10. The process of claim 9, further comprising securing a protective covering piece over top edges of the side walls, the transverse wall, and the flanges before mounting the additional hardware on the flanges.

11. The device of claim 1, wherein each of the receptacles is formed by an eye in one of the side walls.

12. The device of claim 1, further comprising additional receptacles for securing additional hardware to the main frame.

13. The device of claim 12, wherein the additional receptacles include aligned eyes disposed so that the fitting is located between the aligned receptacles and the aligned eyes.

14. The device of claim 13, wherein the additional receptacles further include one additional eye provided in an offset flange section, formed on one of the side walls, that is laterally displaced relative to the rest of the one of the side walls.

15. The device of claim 1, wherein the fitting is a threaded fitting including threaded ends, and the handles are attachable to the threaded fitting.

16. The device of claim 15, wherein a clip is attachable to the threaded fitting in place of at least one of the handles.

* * * * *